(12) United States Patent
Detlefs et al.

(10) Patent No.: US 7,908,255 B2
(45) Date of Patent: Mar. 15, 2011

(54) TRANSACTIONAL MEMORY USING BUFFERED WRITES AND ENFORCED SERIALIZATION ORDER

(75) Inventors: David Detlefs, Westford, MA (US); John Joseph Duffy, Renton, WA (US); Michael M Magruder, Sammamish, WA (US); Goetz Graefe, Madison, WI (US); Vinod K Grover, Mercer Island, WA (US); Timothy Lawrence Harris, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 11/786,174

(22) Filed: Apr. 11, 2007

(65) Prior Publication Data

US 2008/0256073 A1  Oct. 16, 2008

(51) Int. Cl.
*G06F 17/30* (2006.01)
(52) U.S. Cl. ........................................ 707/703; 707/704
(58) Field of Classification Search .................. 707/703, 707/704, 640
See application file for complete search history.

(56) References Cited

U.S. PATENT DOCUMENTS

| 5,428,761 | A | 6/1995 | Herlihy et al. |
| 6,880,045 | B2 | 4/2005 | Pong et al. |
| 7,496,716 | B2 * | 2/2009 | Dice et al. .................. 711/147 |
| 2003/0182462 | A1 | 9/2003 | Moir et al. |
| 2003/0187861 | A1 * | 10/2003 | Lubbers et al. ............... 707/102 |
| 2004/0015642 | A1 | 1/2004 | Moir et al. |
| 2004/0034673 | A1 | 2/2004 | Moir et al. |
| 2004/0225823 | A1 | 11/2004 | Heynemann et al. |
| 2005/0060559 | A1 | 3/2005 | McKenney |
| 2006/0085588 | A1 | 4/2006 | Rajwar et al. |
| 2006/0085591 | A1 | 4/2006 | Kumar et al. |

OTHER PUBLICATIONS

Hammond, et al., "Programming with Transactional Coherence and Consistency (TCC)", Date: Oct. 2004, http://tcc.stanford.edu/publications/tcc_asplos2004.pdf.
Hammond, et al., "Transactional Coherence and Consistency: Simplifying Parallel Hardware and Software", Date: 2004, http://tcc.stanford.edu/publications/tcc_micro2004.pdf.
Spear, et al., "Conflict Detection and Validation Strategies for Software Transactional Memory", http://www.cs.rochester.edu/u/scott/papers/2006_DISC_conflict.pdf.
Johnson, Troy A. et al., "Can Transactions Enhance Parallel Programs?", Proceedings of the 19th International Workshop on Languages and Compilers for Parallel Computing (LCPC), Nov. 2006, 15 pages.
International Search Report and Written Opinion Received for PCT Patent Application No. PCT/US2008/056873, mailed on Jul. 15, 2008, 10 pages.

(Continued)

*Primary Examiner* — Baoquoc To

(57) ABSTRACT

Various technologies and techniques are disclosed that support buffered writes and enforced serialization order in a software transactional memory system. A buffered write process is provided that performs writes to shadow copies of objects and writes content back to the objects after validating a respective transaction during commit. When a write lock is first obtained for a particular transaction, a shadow copy is made of a particular object. Writes are performed to and reads from the shadow copy. After validating the particular transaction during commit, content is written from the shadow copy to the particular object. A transaction ordering process is provided that ensures that an order in which the transactions are committed matches an abstract serialization order of the transactions. Transactions are not allowed to commit until their ticket number matches a global number that tracks the next transaction that should commit.

20 Claims, 9 Drawing Sheets

OTHER PUBLICATIONS

Hammond, L. et al., "Transactional memory coherence and consistency", In: Proceedings on Computer Architecture, 31st Annual International Symposium. Edited by IEEE Society, Jun. 19-23, 2004, pp. 102-113.

Woo, S.K. et al., "An effective recovery under fuzzy checkpointing in main memory databases", Information and Software Technology, vol. 42, No. 3, Feb. 25, 2000, pp. 185-196.

Moore, K. E. et al., "LogTM: log-based transactional memory", In High-Performance Computer Architecture, 12-th International Symposium. Feb. 2006, pp. 254-265.

Garcia-Molina, H. et al., Main memory database systems: an overview, IEEE Transactions on Knowledge and Data Engineering, Dec. 1992, vol. 4, No. 6, pp. 509-516.

* cited by examiner

TRANSACTIONAL MEMORY USING BUFFERED WRITES AND ENFORCED SERIALIZATION ORDER

BACKGROUND

A computer's processing unit executes an instruction stream from a program text of instructions. Each instruction specifies its successor; either the subsequent instruction, or, in the case of a branch or call, some other instruction. So a processor executes one instruction at a time (so-called pipelined and "out-of-order" processors violate this in their implementation, but preserve these semantics). A program generally compiles to a program text with a distinguished start instruction. In a C program, for example, the first instruction of the "main" method is the distinguished start instruction. The "processor context" that determines the sequence of instructions executed after this is often called a "thread of control," or just a "thread." Programs execute in an operating system process, which provides a virtual address space, which allows each process to behave as if it has sole access to all the memory of a "virtual" machine. The operating system process, in addition to the virtual address space, also provides various per-process operating resources, such as file descriptors, and one or more threads. Traditional programs are single-threaded: they execute in a process with only a single thread of control.

A shared-memory multiprocessor has several processors sharing access to the same memory; a write by one processor may be observed by a subsequent read by another processor. Such a machine can be used by running several different programs, each in a process, on the different processors. In this mode, we do not really make use of the shared memory, since the processes each have separate address spaces. In another mode, however, a program may create several threads of control in the process in which it executes, and these threads may execute simultaneously on the multiple processors, and communicate through the shared memory. (Such a multi-threaded, or concurrent program may also execute on a uniprocessor, and in general a program may create more threads than there are available processors. One of the jobs of the operating system is to schedule execution of the runnable threads on the available processors. Thus a running thread may be interrupted at an arbitrary instruction to allow another thread to resume.)

This simultaneous interleaved execution of instructions by the threads makes concurrent programming very difficult. As an analogy, imagine a deck of cards that have been separated such that all the red cards are in one pile and all the black cards are in a second pile. Each card represents an instruction and each pile represents a thread. Combine the piles together using a bridge technique of shuffling. The order of the red cards has not changed relative to each other nor has the order of the black cards but the cards have become interleaved. This is exactly what happens when threads execute concurrently. It should also be clear that there are a very large number of possible interleavings, each representing a possible execution. The program must work correctly for all such possible executions.

When threads execute in a concurrent computing environment, mechanisms are required to manage how each thread interacts with system resources such shared memory. Software transactional memory (STM) is a concurrency control mechanism analogous to database transactions for controlling access to shared memory in concurrent computing. A transaction in the context of transactional memory is a piece of code that executes a series of reads and writes to shared memory, and does so atomically, with the entire transaction executing as if it is the only thread of control executing in the system. If transaction Tx1 observes any write by transaction Tx2, then it observes all writes by Tx2. A data location in the context of transactional memory is the particular segment of shared memory being accessed, such as a single object, a cache line (such as in C++), a page, a single word, etc. One type of concurrency control lock mode in transactional memory systems is optimistic concurrency control, or optimistic locking.

With optimistic concurrency control, the system attempts to make forward progress at the risk that a conflict will be detected later on. The transactional memory system performs automatic resolution of such conflicts, often by rolling back one of the conflicting transactions and re-executing it. Optimistic operations are relatively inexpensive when compared to pessimistic operations since they just read and do not involve writes to shared locations (i.e. taking a lock). As the name implies, the hope for optimistic operations is that there are few conflicts. If this turns out to be false, then there will be already wasted work, and the system must then proceed to throw it away and attempt to resolve the conflict.

One serious issue that optimistic concurrency control does not explicitly address can occur in privatization scenarios. Privatization-related problems may occur when a program has concurrent threads executing transactions that access the same shared memory locations, and one of these transactions privatizes some shared memory location. Privatization occurs when a transaction performs operations that make a shared memory location accessible only to the transaction. For example, if the only reference to some object O is stored in some globally accessible queue Q, and transaction Tx1 being executed by thread T1 performs an operation that removes the reference to O from Q, and stores it into a local variable T1, then Tx1 has privatized O to T1.

With some implementations of STM, privatization can cause unexpected results to occur. Some STM implementations have attempted to achieve high performance by combining optimistic reading with "in-place" writing, in transactional writes are performed directly to a memory location. When these techniques are used to implement a program that performs privatization, the following scenario is possible. Some global location G contains a unique pointer to a shared data structure. Two threads execute transactions that attempt to access this data structure concurrently. Thread T1 executes transaction Tx1, which will read G, and, if the pointer read is non-null, attempt to increment an integer in the data structure to which the pointer refers. Thread T2 executes transaction Tx2, which will copy G into a thread-local variable, and set G to null. Thread T2 then accesses the data structure via the thread-local pointer variable, believing that it has successfully "privatized" the data structure by setting G to null. However, with optimistic reads and in-place writes, one possible execution has Tx1 read G first, observing a non-NULL value. Now Tx2 executes in its entirety. Tx2 has written a location, G, that Tx1 has read, thus "dooming" Tx1 to abort, but this will not be discovered until Tx1 attempts to commit. So Tx1 continues executing, incrementing a field in the data structure. This increment will be undone when Tx1 fails to commit, but from the point of view of the non-transactional code executing after Tx2 in thread T2, both this write and the write that performs the "undo" operation are "inexplicable;" they occur for no reason, and may make the program run incorrectly.

Another class of privatization-related problems involves "serialization anomalies." As discussed previously, transactions simplify concurrent programming by providing the programmer the illusion that concurrent transactions execute in some serial order. In particular, if a read by transaction Tx2 observes a write by transaction Tx1, then Tx2 must be serialized after Tx1. A serialization anomaly occurs when transactions complete in an order different from their serialization order. When a program employs a privatization idiom, this can cause the non-transactional code executing in a thread after one of the transaction completes to observe "inexplicable" writes.

SUMMARY

Various technologies and techniques are disclosed that support buffered writes and enforced serialization order in a software transactional memory system. A software transactional memory system is provided that is operable to manage transactions. A buffered write process is provided that performs writes to and reads from shadow copies of objects and writes content back to the objects after validating a respective transaction during commit. When a write lock is first obtained for a particular transaction, a shadow copy is made of a particular object. Writes are performed to the shadow copy. After validating the particular transaction during commit, content is written from the shadow copy to the particular object.

A transaction ordering process is provided that ensures that an order in which the transactions are committed matches an abstract serialization order of the transactions. An entered commit counter is provided that represents a first number of transactions that have entered commit processing. An exited commit counter is provided that represents a second number of transactions that have exited commit processing. When a particular transaction enters commit processing, the system atomically reads and increments the entered commit counter and assigns a value that was read from the entered commit counter as a ticket number for the particular transaction. When the exited commit counter matches the ticket number for the particular transaction, the particular transaction exits commit processing.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
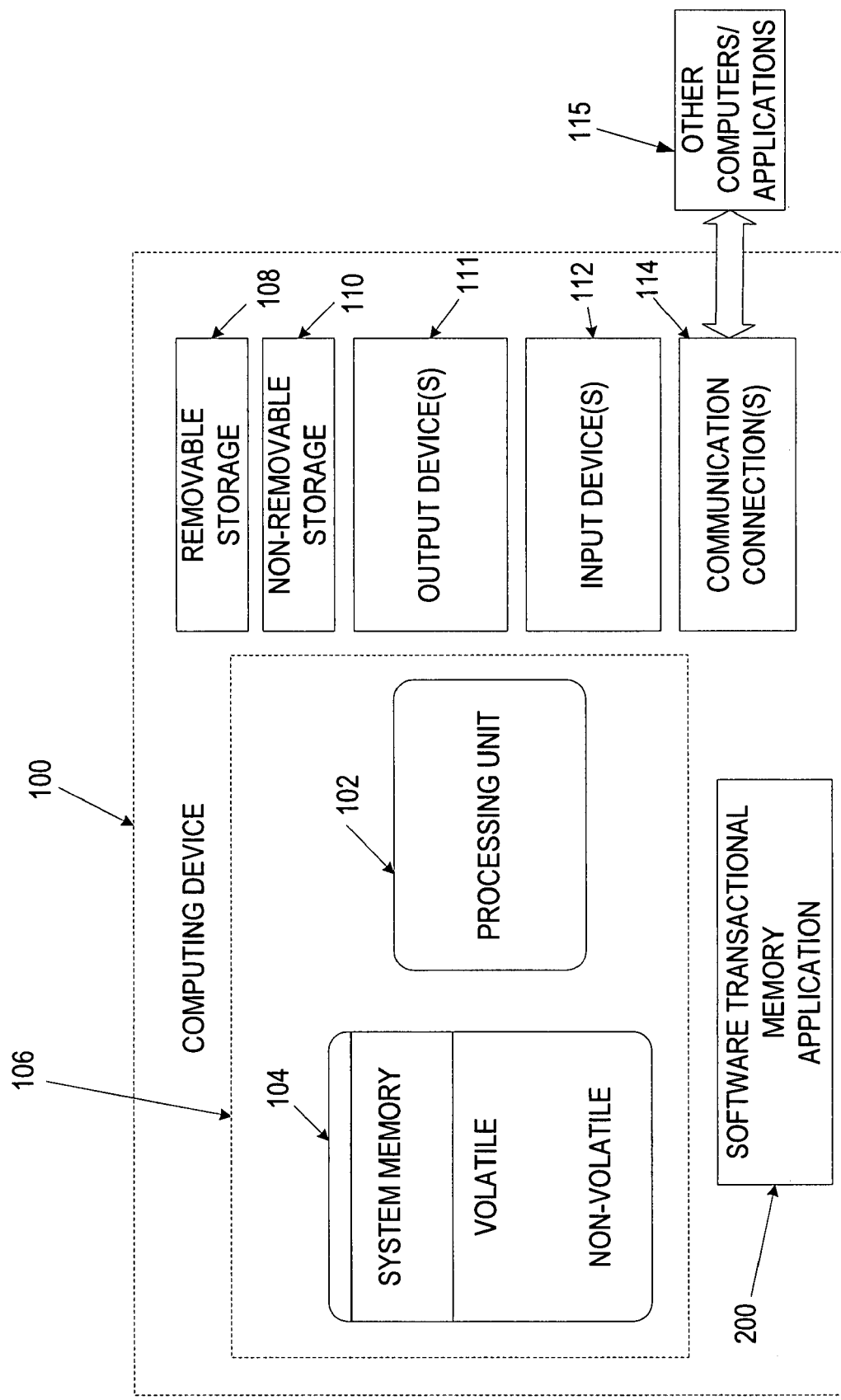
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a software transactional memory system is provided that uses a buffered write process to perform writes to shadow copies of objects and writes content back to the objects after validating a respective transaction during commit. In another implementation, a transaction ordering process is provided that ensures that an order in which the transactions are committed matches the abstract serialization order of the transactions. Transactions simplify concurrent programming by giving programmers the illusion that transactions execute serially, each in isolation. The abstract serialization order is simply the order in which the transactions appear to execute. It is determined by the reads and writes performed by the transactions. If Tx1 and Tx2 are transactions that both commit, and if a read by Tx2 observes a value written by Tx1, then Tx1 must precede Tx2 in the abstract serialization order. If each reads a value that the other writes, then they can't be serialized, and therefore cannot both commit, so at least one must abort. If both commit, if each must precede the other, then one must abort. By using the buffered write process and/or the transaction ordering process, at least some of the privatization-related problems are avoided.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software transactional memory application 200. Software transactional memory application 200 will be described in further detail in FIG. 2.

Figure 2:
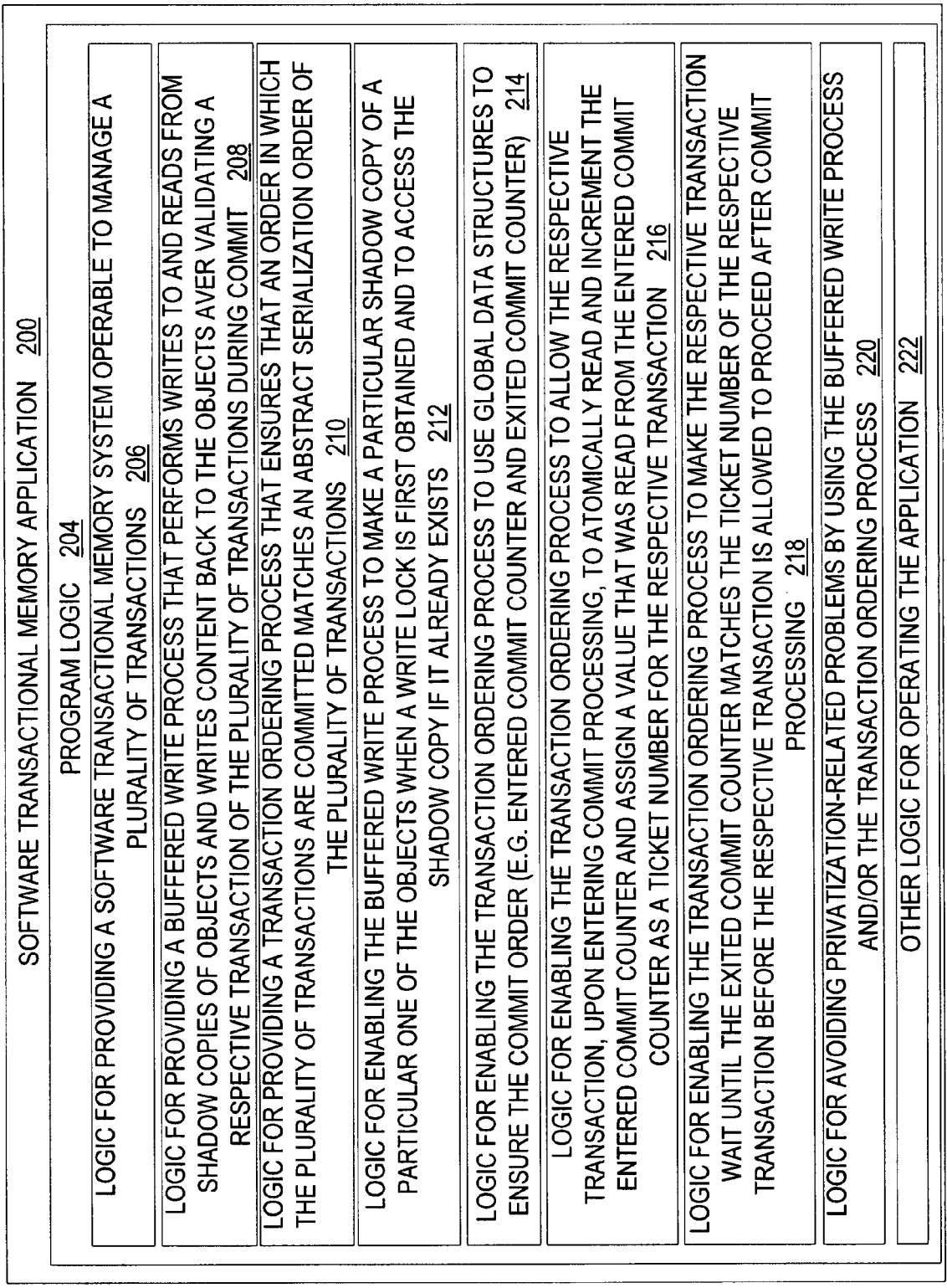
FIG. 2 is a diagrammatic view of software transactional memory application of one implementation operating on the computer system of FIG. 1.

Turning now to FIG. 2 with continued reference to FIG. 1, software transactional memory application 200 operating on computing device 100 is illustrated. Software transactional memory application 200 is one of the application programs that reside on computing device 100. However, it will be understood that software transactional memory application 200 can alternatively or additionally be embodied as computer-executable instructions on one or more computers and/or in different variations than shown on FIG. 1. Alternatively or additionally, one or more parts of software transactional memory application 200 can be part of system memory 104, on other computers and/or applications 115, or other such variations as would occur to one in the computer software art.

Software transactional memory application 200 includes program logic 204, which is responsible for carrying out some or all of the techniques described herein. Program logic 204 includes logic for providing a software transactional memory system operable to manage a plurality of transactions 206; logic for providing a buffered write process that performs writes to and reads from shadow copies of objects and writes content back to the objects after validating a respective transaction of the plurality of transactions during commit 208; logic for providing a transaction ordering process that ensures that an order in which the plurality of transactions are committed matches an abstract serialization order of the plurality of transactions 210; logic for enabling the buffered write process to make a particular shadow copy of a particular one of the objects when a write lock is first obtained and to access the shadow copy if it already exists 212; logic for enabling the transaction ordering process to use global data structures to ensure the commit order (e.g. entered commit counter and exited commit counter) 214; logic for enabling the transaction ordering process to allow the respective transaction, upon entering commit processing, to atomically read and increment the entered commit counter and assign a value that was read from the entered commit counter as a ticket number for the respective transaction 216; logic for enabling the transaction ordering process to make the respective transaction wait until the exited commit counter matches the ticket number of the respective transaction before the respective transaction is allowed to proceed after commit processing 218; logic for avoiding privatization-related problems by using the buffered write process and/or the transaction ordering process 220; and other logic for operating the application 222. In one implementation, program logic 204 is operable to be called programmatically from another program, such as using a single call to a procedure in program logic 204.

Figure 3:
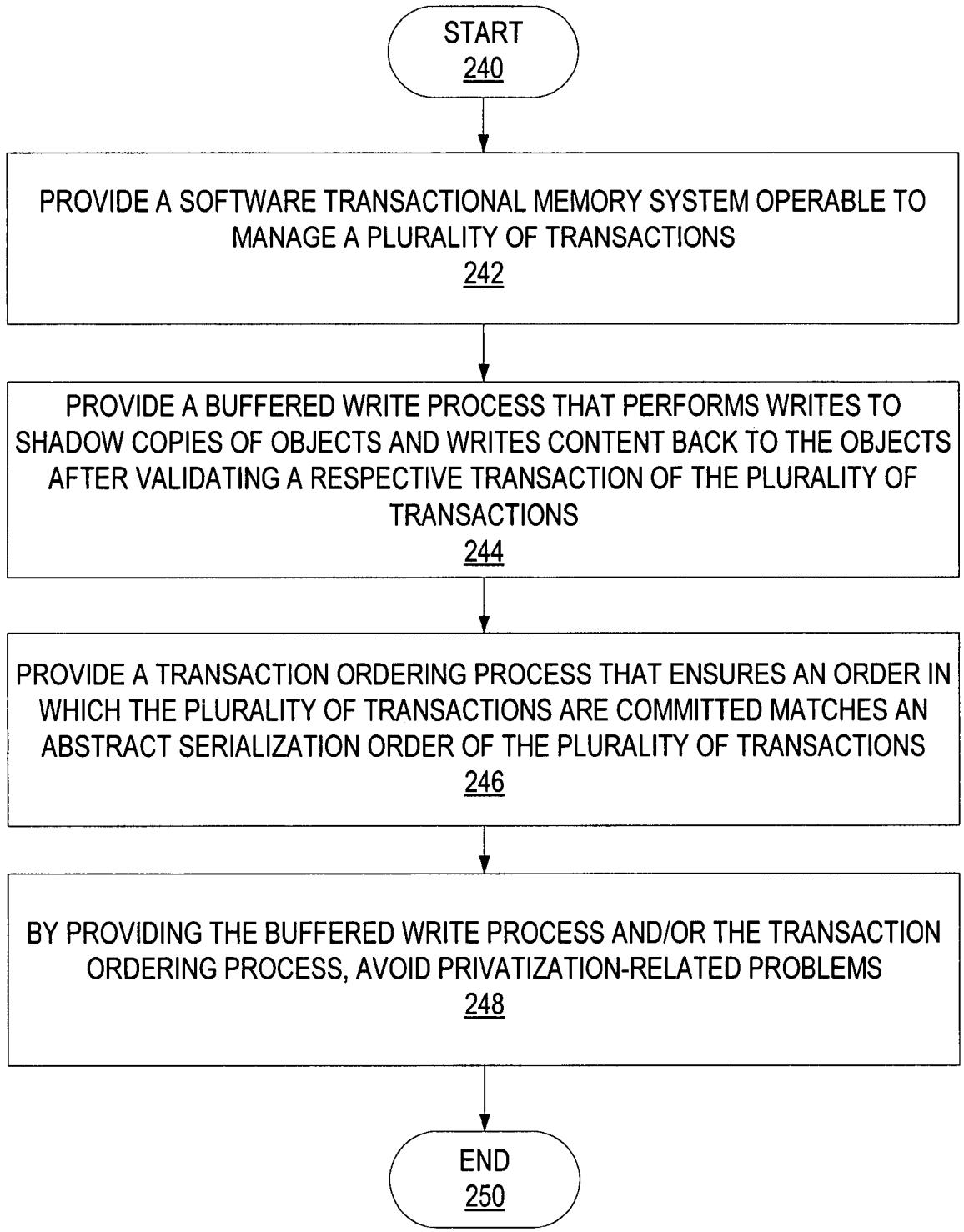
FIG. 3 is a high-level process flow diagram for one implementation of the system of FIG. 1.

Turning now to FIGS. 3-9 with continued reference to FIGS. 1-2, the stages for implementing one or more implementations of software transactional memory application 200 are described in further detail. FIG. 3 is a high level process flow diagram for software transactional memory application 200. In one form, the process of FIG. 3 is at least partially implemented in the operating logic of computing device 100. The process begins at start point 240 with providing a software transactional memory system operable to manage a plurality of transactions (stage 242). A buffered write process is provided that performs writes to shadow copies of objects and writes content back to the objects after validating a respective transaction of the plurality of transactions (stage 244). A transaction ordering process is provided that ensures an order in which the plurality of transactions are committed matches an abstract serialization order of the plurality of transactions (stage 246). By providing the buffered write process and/or the transaction ordering process, some privatization-related problems can be avoided (stage 248). The process ends at end point 250.

Figure 4:
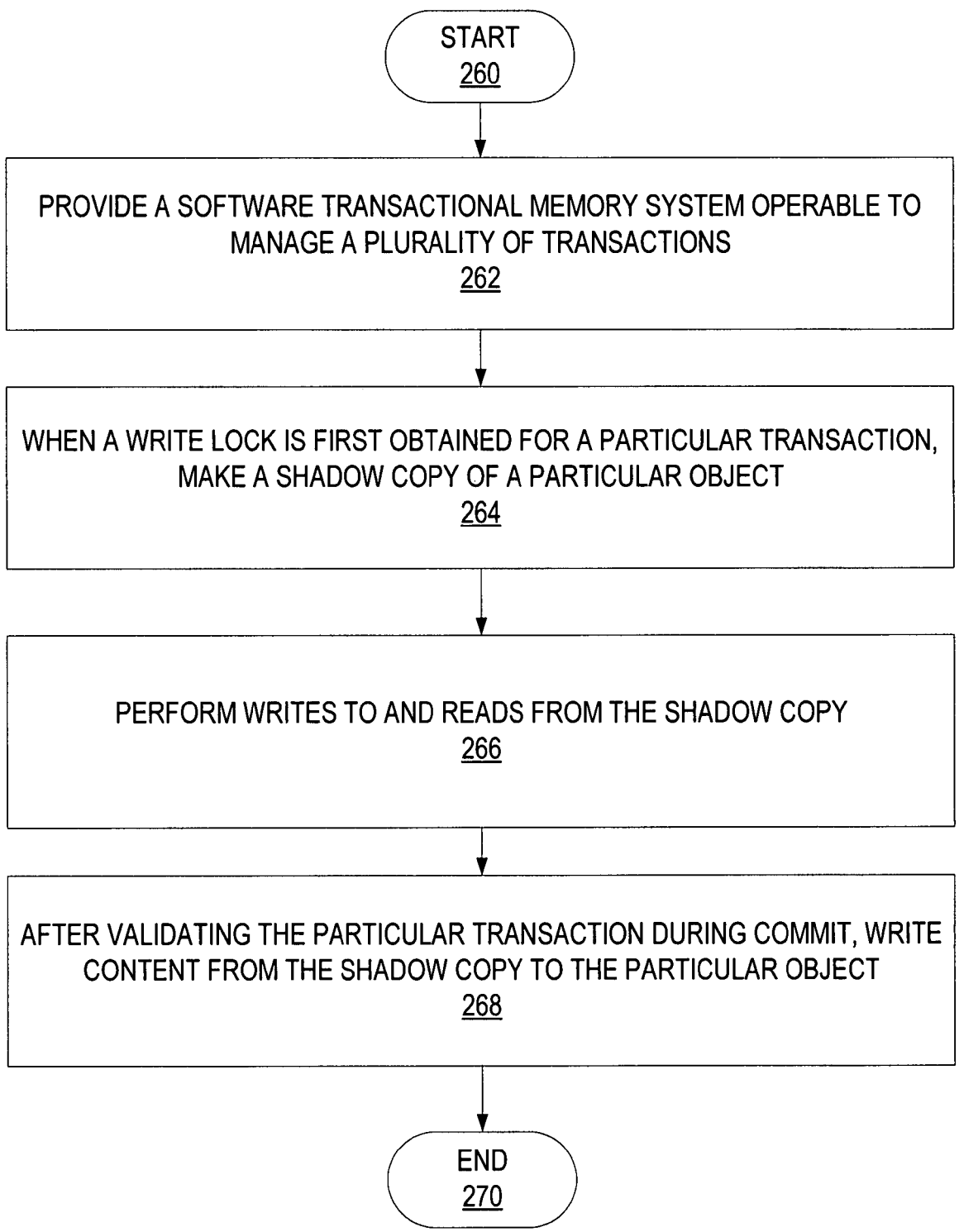
FIG. 4 is a process flow diagram for one implementation of the system of FIG. 1 illustrating the high level stages involved in using buffered writes with a software transactional memory system.

FIG. 4 illustrates one implementation of the high level stages involved in using buffered writes with a software transactional memory system. In one form, the process of FIG. 4 is at least partially implemented in the operating logic of computing device 100. The process begins at start point 260 with providing a software transactional memory system operable to manage a plurality of transactions (stage 262). When a write lock is first obtained for a particular transaction, a shadow copy is made of a particular object (stage 264). Writes are performed to and reads from the shadow copy (stage 266). The following is an explanation of how the reads are performed in one implementation that uses a shadow copy, but other read and write variations could also be used. If a read is made from a non-write-locked object, then reads are made from the object directly. If the object is write-locked, the lock (e.g. in the transactional memory word) points to a shadow copy in some transaction's log. If that is in the log of some other transaction, then there is a conflict, and some contention management action must be taken. If it is the log of the current transaction, then reads are performed from the shadow copy the current transaction points to. After validating the particular transaction during commit, content is written from the shadow copy to the particular object (stage 268). The process ends at end point 270.

Figure 5:
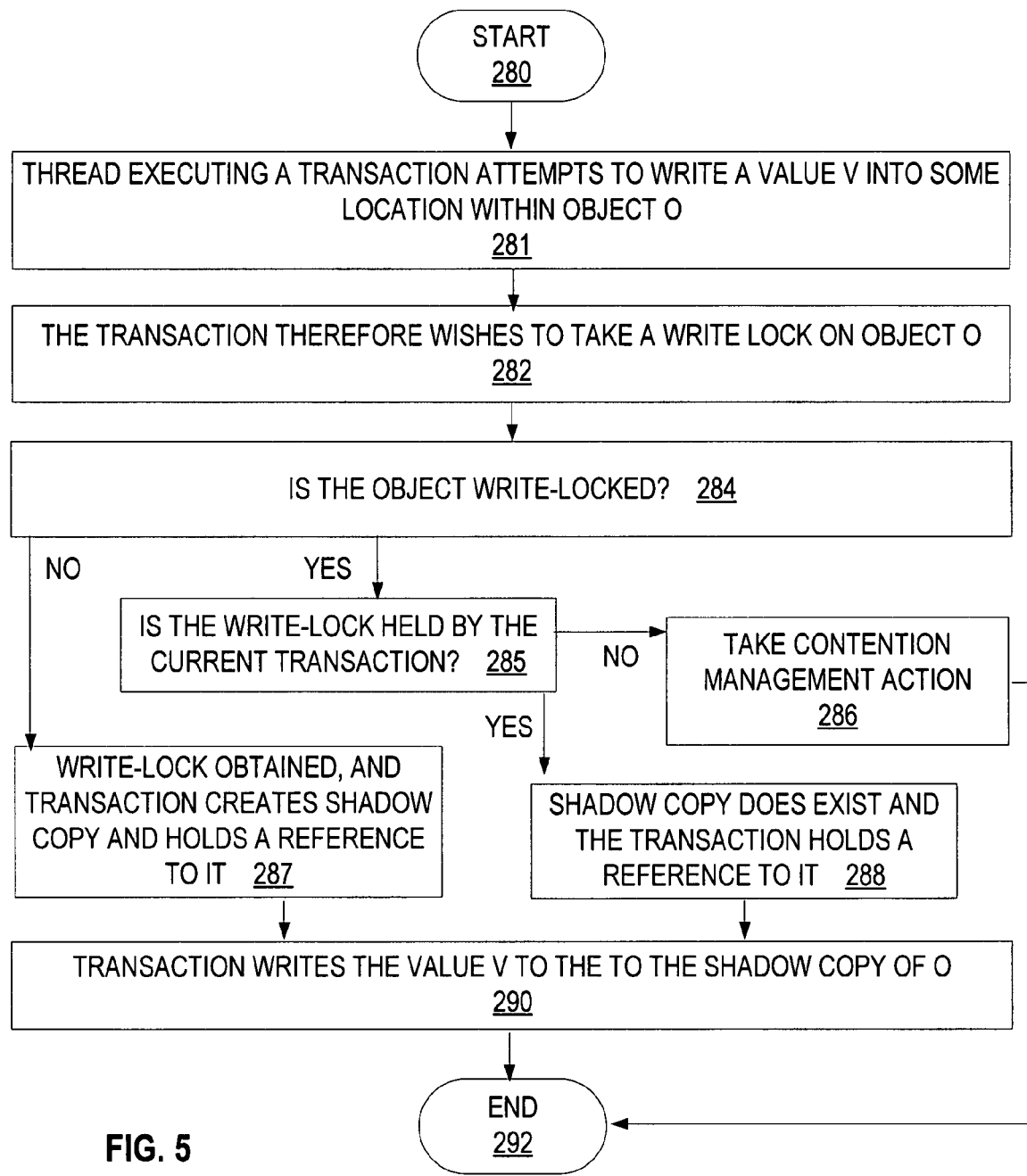
FIG. 5 is a process flow diagram for one implementation of the system of FIG. 1 illustrating the more detailed stages involved in using buffered writes with a software transactional memory system.

FIG. 5 illustrates one implementation of the more detailed stages involved in using buffered writes with a software transactional memory system. In one form, the process of FIG. 5 is at least partially implemented in the operating logic of computing device 100. The process begins at start point 280 with a thread executing a transaction attempting to write a value V into some location in object O (stage 281). The transaction therefore desires to take a write lock on object O (stage 282). If the object is not write-locked (decision point 284), then a write-lock is obtained, and the transaction creates a shadow copy and holds a reference to it (stage 287). If the object is write-locked (decision point 284), and the write-lock is held by the current transaction (decision point 285), then the transaction holds a reference to it (stage 288). In either of these events, the transaction writes the value V to the shadow copy of O (stage 290). However, if the object is write-locked (decision point 284), and the write-lock is not held by the current transaction but is instead held by another transaction (decision point 285), then contention management action is taken (stage 286). The process ends at end point 292.

Figure 6:
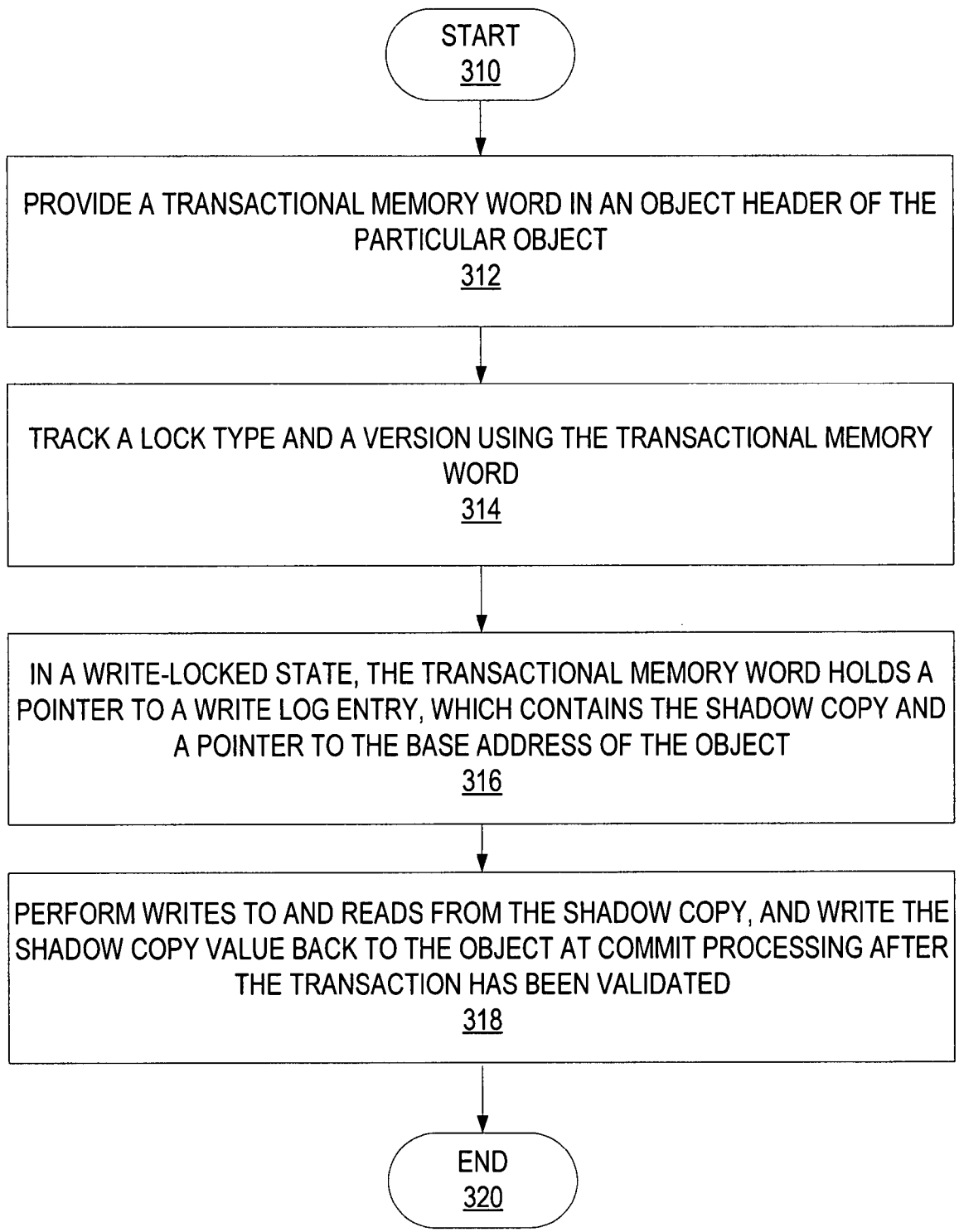
FIG. 6 is a process flow diagram for one implementation of the system of FIG. 1 illustrating the stages involved in tracking buffered write information in a transactional memory word.

FIG. 6 illustrates one implementation of the stages involved in tracking buffered write information in a transactional memory word. In one form, the process of FIG. 6 is at least partially implemented in the operating logic of computing device 100. The process begins at start point 310 with providing a transactional memory word in an object header of the particular object (stage 312). A lock type and a version are tracked using the transactional memory word (stage 314), as described in more detail in FIG. 7. In a write-locked state, the transactional memory word holds a pointer to a write log entry, which contains the shadow copy and a pointer to the base address of the object (stage 316). Writes are performed to and reads are performed from the shadow copy, and the shadow copy value is written back to the object at commit processing after the transaction has been validated (stage 318). The process ends at end point 320.

Figure 7:
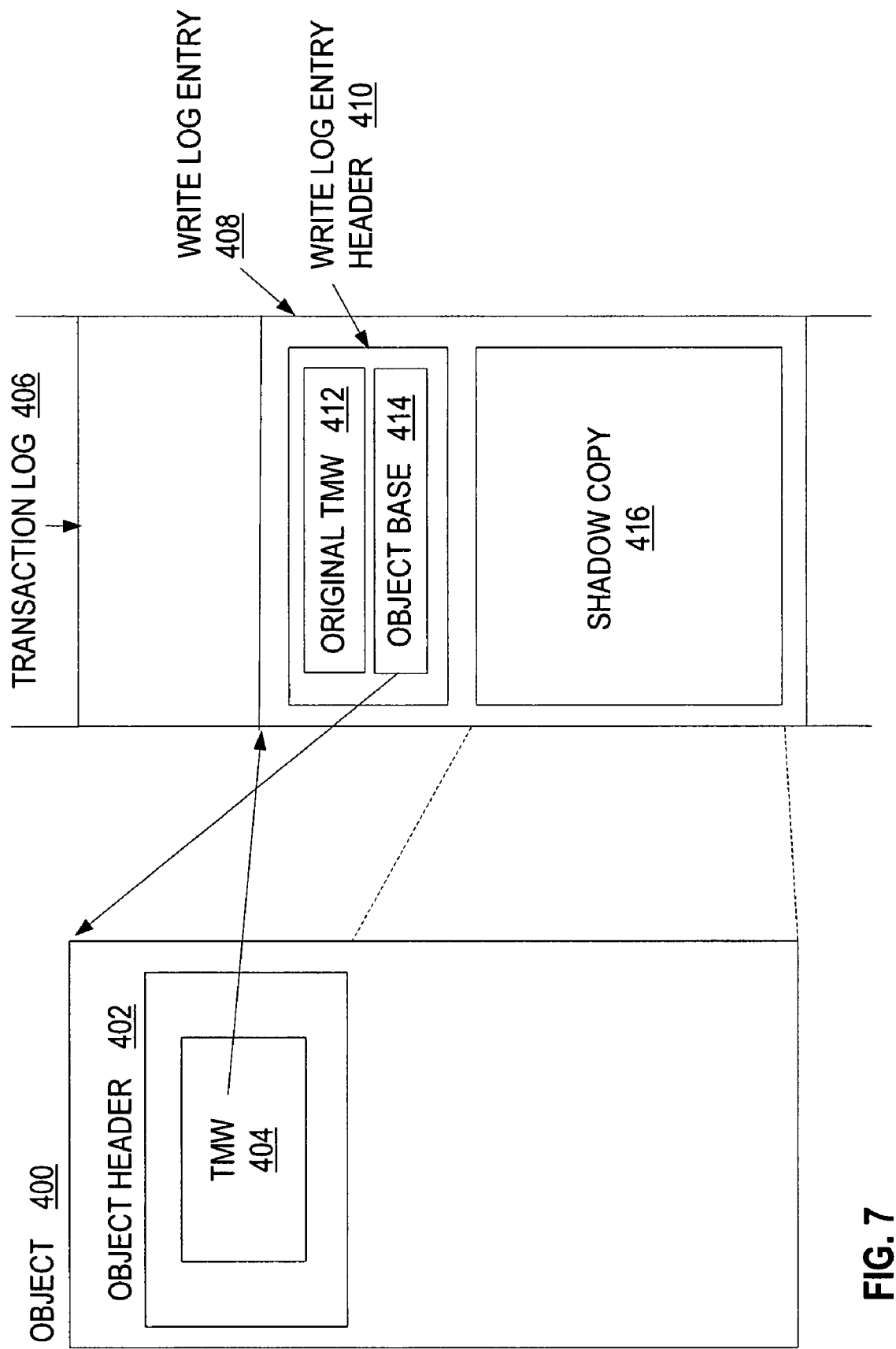
FIG. 7 is a logical diagram illustrating a transactional memory word holding a reference to the shadow copy of the object and the object in shared memory.

FIG. 7 is a logical diagram illustrating a transactional memory word 404 that is holding a reference to a write log entry 408 indicating that the object has been write-locked by the transaction owning the transaction log 406. The write log entry starts with a fixed-size header 410, which contains original TMW 412, which is the value of the object's TMW before it was write-locked, and object base 414, a pointer back to the write-locked object. Following the header is the shadow copy 416, which is initialized with the contents of the object 400 following the object header 402. The transaction will write to and read from this shadow copy, writing its updated contents back to the object 400 when the transaction commits. In another implementation, the transactional memory word might contain a pointer directly to the shadow copy; a pointer to the start of the write log entry could be recovered by subtracting the size of the header, which is a constant. The transactional memory word 404 is present in the object header 402 of object 400.

When an object is not write-locked, the transactional memory word includes a version number and a list/count and/or indicator of readers (e.g. pessimistic readers). When an object is write-locked, a write lock entry of the transactional memory word also holds the TMW value that was read before the object was write-locked. In one implementation, the list/count and/or indicator of readers include a count of the number of readers (e.g. pessimistic) accessing the particular value at a given point in time. In another implementation, the list/count and/or indicator of readers include a list of the particular readers (e.g. pessimistic) accessing the particular value at a given point in time. In yet another implementation, the list/count and/or indicator of readers is simply a flag or other indicator to indicate that there are one or more readers (e.g. pessimistic) accessing the particular value at a given point in time. It will be appreciated that other transactional memory word attributes and/or combinations thereof could alternatively or additionally be used in other implementations to indicate version numbers, write locks, etc. for use by a transactional memory system to make concurrency control decisions.

Figure 8:
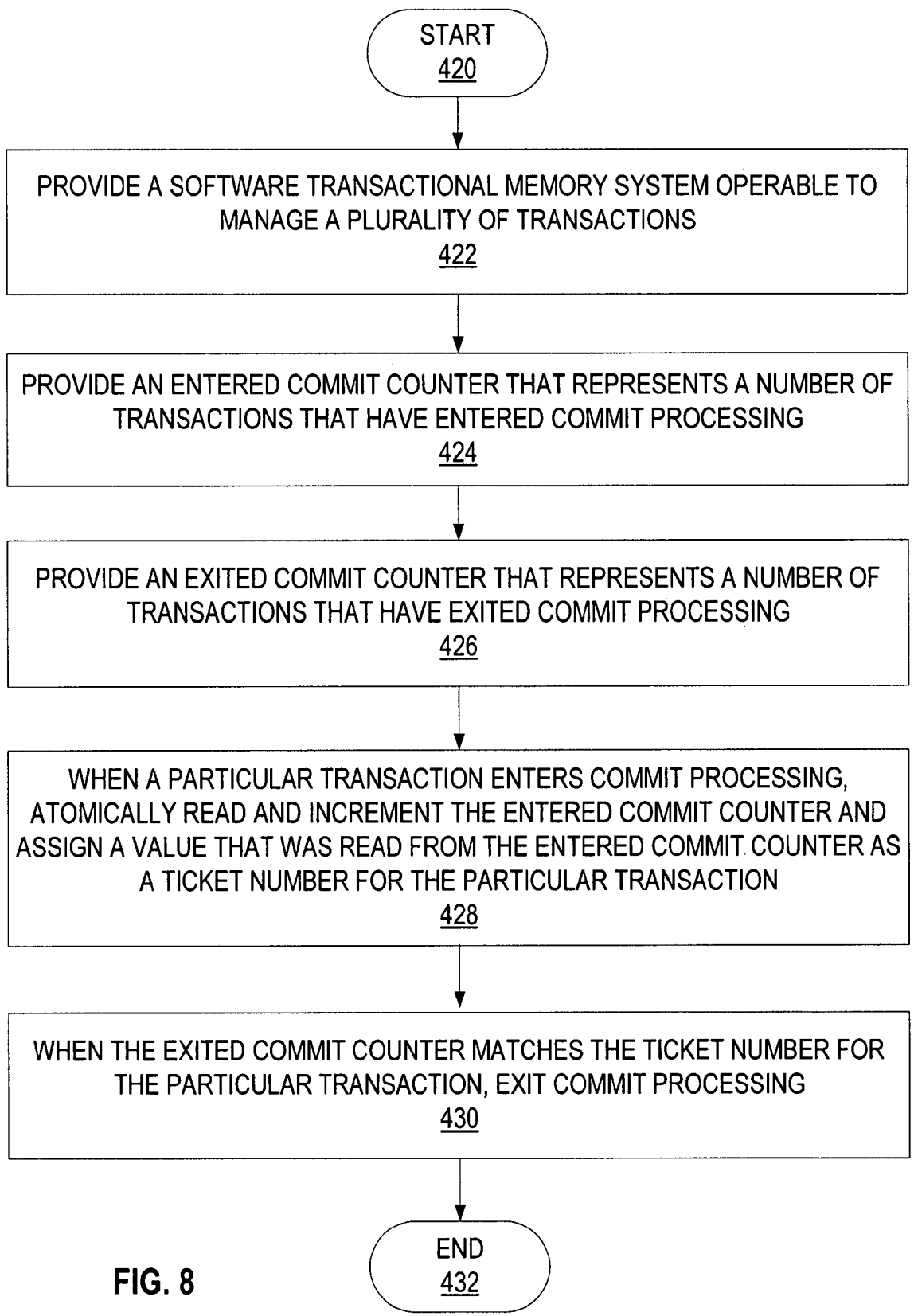
FIG. 8 is a process flow diagram for one implementation of the system of FIG. 1 that illustrates the high level stages involved in ensuring that transactions commit in the same order as the abstract serialization order.

FIG. 8 illustrates one implementation of the high level stages involved in ensuring that transactions commit in the same order as the abstract serialization order. In one form, the process of FIG. 8 is at least partially implemented in the operating logic of computing device 100. The process begins at start point 420 with providing a software transactional memory system operable to manage a plurality of transactions (stage 422). An entered commit counter is provided that represents a number of transactions that have entered commit processing (stage 424). An exited commit counter is provided that represents a number of transactions that have exited commit processing (stage 426). When a particular transaction enters commit processing, it atomically reads and increments the entered commit counter and assigns a value that was read from the entered commit counter as a ticket number for the particular transaction (stage 428). When the exited commit counter matches the ticket number for the particular transaction, the particular transaction is allowed to exit from commit processing (stage 430). The process ends at end point 432.

Figure 9:
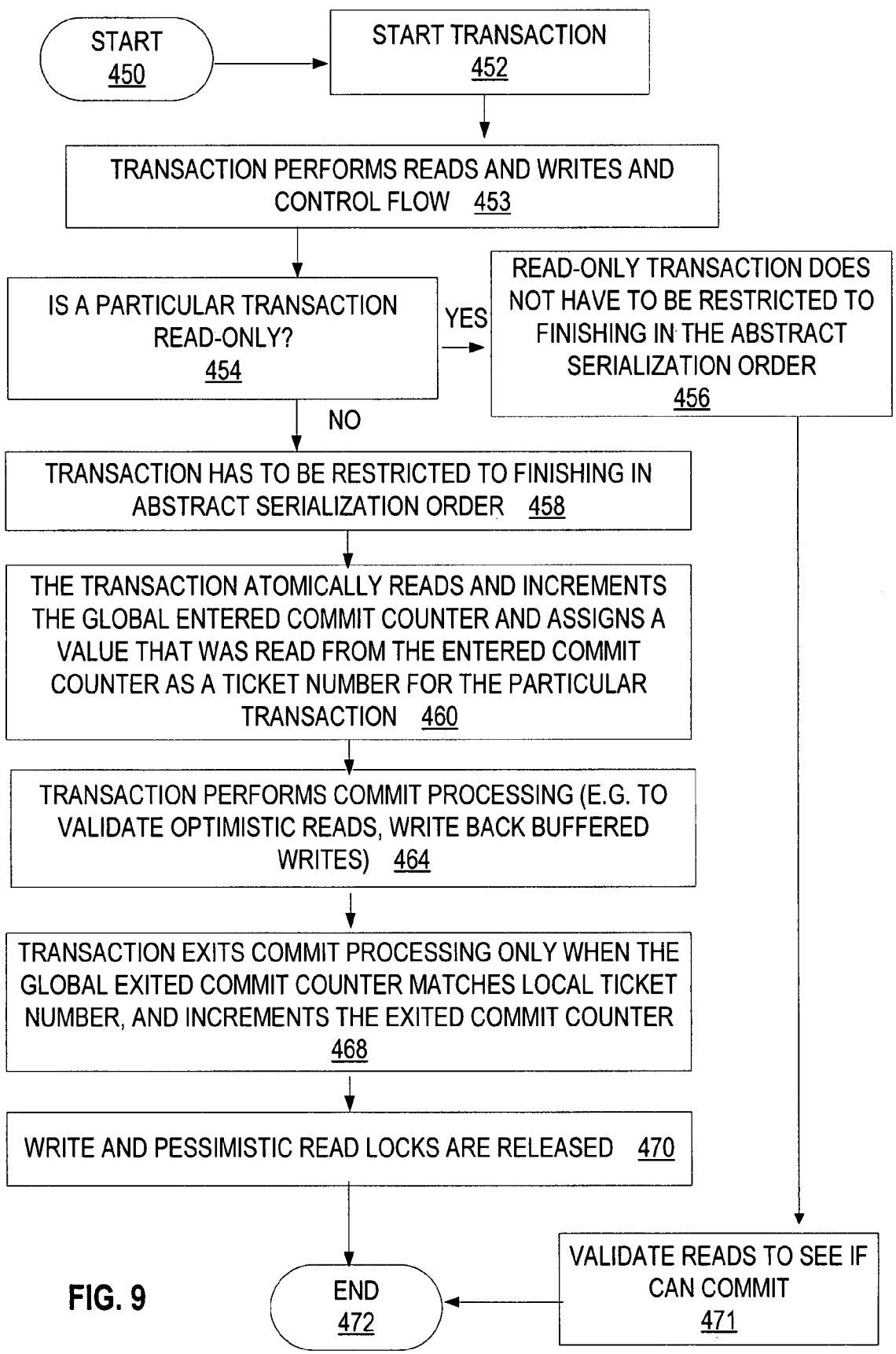
FIG. 9 is a process flow diagram for one implementation of the system of FIG. 1 that illustrates the more detailed stages involved in ensuring that transactions commit in the same order as the abstract serialization order.

FIG. 9 illustrates one implementation of the more detailed stages involved in ensuring that transactions commit in the same order as the abstract serialization order. In one form, the process of FIG. 9 is at least partially implemented in the operating logic of computing device 100. The process begins at start point 450 with starting the transaction (stage 452). The transaction performs reads and writes and control flow (stage 453). If the particular transaction is read-only (decision point 454), then the read-only transaction does not have to be restricted to finishing commit in the same order as the abstract serialization order (stage 456) and can proceed to validating reads to see if it can commit (stage 471). At that point the process ends at end point 472.

If the transaction is not read-only (decision point 454), then the transaction has to be restricted to finishing commit in the same order as the abstract serialization order (stage 458). The transaction atomically reads and increments the global entered commit counter and assigns a value that was read from the entered commit counter as a ticket number for the particular transaction (stage 460). The transaction performs commit processing (stage 464). In one implementation, during commit processing, the following steps are performed: (1) optimistic reads are validated, ensuring that the locations read are still not write-locked, and that they hold the same version numbers they did when the TMW was read originally; and (2) shadow copies are written back. The transaction exits commit processing only when the global exited commit counter matches the local ticket number, and the transaction increments the exited commit counter (stage 468). After the transaction exits commit processing, write and pessimistic read locks are released (stage 470). The process ends at end point 472.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage medium having computer-executable instructions for causing a computer to perform steps comprising:

provide a software transactional memory system operable to manage a plurality of transactions executed by one or more threads of execution in a multi-threaded processing environment, wherein the transactions are executed to perform operations on objects located in a shared memory accessible to the one or more threads of execution;

provide a buffered write process that (a) performs writes to and reads from shadow copies of the objects instead of performing writes to and reads from the objects themselves and (b) that writes content from the shadow copies back to the objects responsive to determining that modifications made to the shadow copies by a respective transaction of the plurality of transactions will be made permanent during commit, wherein the buffered write process determines the location of a shadow copy of an object by accessing a pointer to the shadow copy stored in the object; and provide a transaction ordering process that ensures that an order in which the plurality of transactions are committed matches an abstract serialization order of the plurality of transactions.

2. The computer storage medium of claim 1, wherein the buffered write process is operable to make a particular shadow copy of a particular one of the objects when a write lock is first obtained.

3. The computer storage medium of claim 1, wherein the buffered write process is operable to access a particular shadow copy of a particular one of the objects responsive to determining that the particular shadow copy already exists.

4. The computer storage medium of claim 1, wherein the transaction ordering process is operable to use a global data structure to ensure the order in which the transactions are committed matches the abstract serialization order.

5. The computer storage medium of claim 4, wherein the global data structure includes an entered commit counter and an exited commit counter, the entered commit counter representing a first number of transactions that have entered commit processing, and the exited commit counter representing a second number of transactions that have exited commit processing.

6. The computer storage medium of claim 5, wherein when the respective transaction enters commit processing, the respective transaction atomically reads and increments the entered commit counter, and assigns a value that was read from the entered commit counter as a ticket number for the respective transaction.

7. The computer storage medium of claim 6, wherein the respective transaction waits until the exited commit counter matches the ticket number of the respective transaction before the respective transaction is allowed to proceed after commit processing.

8. The computer storage medium of claim 1, wherein use of the buffered write process and the transaction ordering process ensure privatization-related problems are avoided.

9. A method for providing buffered writes in a software transactional memory system comprising the steps of:

providing a software transactional memory system operable to manage a plurality of transactions executed by one or more threads of execution in a multi-threaded processing environment, wherein the transactions are executed to perform operations on objects located in a shared memory accessible to the one or more threads of execution;

when a write lock is first obtained for a particular transaction, making a shadow copy of a particular object;

performing writes to and reads from the shadow copy instead of to the particular object responsive to execution of the particular transaction, wherein writing to and reading from the shadow copy comprises determining the location of the shadow copy of the object by accessing a pointer to the shadow copy stored in the particular object; and responsive to determining that modifications made to the shadow copy by a particular transaction will be made permanent during commit, writing content from the shadow copy to the particular object.

10. The method of claim 9, wherein the particular object has a transactional memory word in an object header, the transactional memory word being operable to track a lock type and a version.

11. The method of claim 10, wherein the transactional memory word represents the pointer to the shadow copy.

12. The method of claim 9, wherein the particular transaction is allowed to exit from commit processing in a same order as the particular transaction was serialized.

13. The method of claim 12, wherein the particular transaction does not exit commit processing until a ticket number of the particular transaction matches a global counter identifying a next transaction that should be allowed to commit.

14. A computer storage medium having computer-executable instructions for causing a computer to perform the steps recited in claim 9.

15. A method for ensuring transactions in a software transactional memory system are committed in serialization order comprising the steps of:

providing a software transactional memory system operable to manage a plurality of transactions executed by one or more threads of execution in a multi-threaded processing environment, wherein the transactions are executed to perform operations on objects located in a shared memory accessible to the one or more threads of execution;

providing an entered commit counter that represents a first number of transactions that have entered commit processing wherein commit processing of a transaction comprises determining if modifications made to a shadow copy of a particular object by the transaction will be made permanent and wherein modifying the shadow copy comprises determining the location of the shadow copy by accessing a pointer to the shadow copy stored in the particular object;

providing an exited commit counter that represents a second number of transactions that have exited commit processing;

when a particular transaction of the plurality of transactions enters commit processing, atomically reading and incrementing the entered commit counter and assigning a value that was read from the entered commit counter as a ticket number for the particular transaction; and when the exited commit counter matches the ticket number for the particular transaction, committing the particular transaction.

16. The method of claim 15, wherein a buffered write process is used to perform writes to and reads from a shadow copy of a particular object responsive to executing the particular transaction until the particular transaction commits.

17. The method of claim 16, wherein the shadow copy of the particular object is made when a write lock is first obtained by the particular transaction.

18. The method of claim 17, wherein writes are performed to and reads are performed from the shadow copy of the particular object.

19. The method of claim 18, wherein content is written from the shadow copy to the particular object after the particular transaction is validated during commit.

20. A computer storage medium having computer-executable instructions for causing a computer to perform the steps recited in claim 15.

* * * * *